United States Patent Office 2,716,613
Patented Aug. 30, 1955

2,716,613

WATER SOLUBLE ADHESIVE AND A PROCESS OF MAKING IT

William Schoen, Laurel, Miss., assignor to Masonite Corporation, Laurel, Miss., a corporation of Delaware No Drawing. Application June 1, 1951,
Serial No. 229,541

7 Claims. (Cl. 106—163)

This invention relates to a process of preparing a water-soluble adhesive from dried water-soluble hydrolysis products of lignocellulose and the product thereof.

In U. S. Patent No. 2,224,135, issued December 10, 1940, to Robert M. Boehm, lignocellulose materials are hydrolyzed under high temperature and pressure in the presence of moisture and fiberized; water solubles are then removed from the hydrolyzed fiber, the fiber is used in making boards, and the water solubles are used in making by-products such as aldehydes, alcohols, and organic acids. The patent also states that the water solubles thus obtained or further concentrated by evaporation of water, may be used as an adhesive.

These water solubles reduced to a powdery state as by evaporation of water are known in the trade as "Masonoid." The terms "water solubles" and "water-soluble reaction product" as used herein refer to the dried water solubles. The composition of these water solubles is approximately as follows: pentosans and hexosans 60–80%, lignin—5–25%, non-sugar carbohydrates—5–15%, and gums—2–8%.

While the above described water solubles have good adhesive properties, they are also characterized by relatively high hygroscopicity and tend to become caked and gummy upon exposure to the atmosphere. For this reason, it is necessary to store the dry powder in airtight containers and even in this condition the adhesive tends to cake and becomes difficult to use. Furthermore, under conditions of high humidity the adhesive material absorbs moisture and a bond prepared therefrom weakens; upon taking up moisture the bond tends to liquefy whereas upon losing moisture it tends to harden and to become brittle.

Applicant's application Serial No. 102,715, filed July 1, 1949, and entitled "Improved Adhesive Material," Patent No. 2,643,953, discloses and claims the process of preparing an adhesive having improved water resistance from these water solubles. That process involves the steps of drying the water solubles (dry product called "Masonoid"), slurrying the Masonoid with methanol and removing the methanol from the slurry, washing the residue with a solvent, and then drying the residue.

The present invention, which is a continuation-in-part of the above mentioned application Serial No. 102,715, stems from the discovery that an adhesive composition possessing greatly improved physical characteristics is obtained when the methanol treatment of the water solubles is carried out in the presence of a considerable quantity of ammonia.

The primary object of the invention, therefore, resides in the provision of a process for the preparation of a greatly improved water-soluble adhesive composition from the water soluble material obtained from the reaction product of the thermohydrolytic treatment of lignocellulose at elevated pressures and the product thereof. Another object of the invention is the substantial reduction of hygroscopicity of the above described water soluble material. Further objects of the invention will be apparent from the following detailed description of the novel process.

It has been discovered that an improved adhesive composition may be produced by a modification of the process disclosed in my above-referred-to earlier filed application and wherein the water soluble material is slurried with methanol in the presence of ammonia. While it is preferable to employ anhydrous ammonia, aqueous ammonium hydroxide may also be used as the source of ammonia. Although the exact nature of the reaction which takes place is not known, the methanol extracted product contains a greatly increased amount of fixed nitrogen thus indicating that reaction does take place in the present process between the water solubles and the ammonia. This is illustrated by the fact that while the crude water soluble material has a nitrogen content of only from about 0.06% to about 0.08%, the ammonia treated methanol extracted product of the present invention contains from about 1% of nitrogen to as much as 2 or 3% of nitrogen which has apparently been chemically fixed or combined. The dried products are relatively fine powders which maintain their free flowing characteristics for periods of time ranging up to more than 35 days. This is of considerable commercial importance inasmuch as the improved adhesive compositions are marketed in dry condition. Moreover, the ammoniation of the water solubles does not alter in any way the water solubility of the adhesive products.

In carrying out the process of the present invention the water soluble material is slurried in methanol and maintained under mechanical agitation for a period of time within the range of about 1 hour to about 6 hours or more in the presence of ammonia. While either dry or substantially dry water solubles may be employed, it is of advantage to conduct the methanol-ammonia treatment in the substantial absence of water since this eliminates the necessity of water removal subsequent to the ammoniation treatment. Similarly, while the water soluble material may be slurried in methanol and thereafter anhydrous ammonia may be passed through the slurry, there have been indications that a greater amount of fixed nitrogen may be introduced into the product by suspending the water soluble material in ammonia-saturated methanol. However, while the best results are obtained in the above described manner, the reaction has also been found to take place when aqueous ammonium hydroxide is employed as the source of ammonia. The methanol treatment may be conducted at room temperature or, in the case of employment of ammonia-saturated methanol, at temperatures as low as about 0° C. On the other hand, good results have been obtained by carrying out the process under reflux at atmospheric pressure although, obviously, employment of the more elevated temperatures increases the problem of complete ammonia utilization.

It will be seen that one of the outstanding advantages of the present invention resides in the elimination of the necessity, which has been disclosed in the parent application, for washing the methanol-ammonia treated product with an inert solvent such as the acetone and the like solvents. The elimination of this solvent treatment constitutes a desirable commercial advantage since it simplifies the process and reduces the expense thereof.

The invention will be further illustrated by the following specific examples. It should be kept in mind, however, that the examples are given for illustrative purposes alone and the invention is to be limited only by the scope of the appended claims. In the examples, all parts are by weight unless otherwise specified.

Example 1

50 gm. of dry water solubles were added with stirring to 500 cc. of methanol. Anhydrous ammonia was passed through the slurry for 6 hours at room temperature while the stirring was continued. The residue was filtered, washed several times with methanol, and air dried. The product was a fine grained tan powder which contained 1.16% of nitrogen. This material possessed excellent adhesive properties and exhibited good resistance to caking and gumming during storage and shipment.

The above procedure was repeated except that the methanol-water solubles slurry was refluxed during the passage of ammonia therethrough. The product was similar to that described above and had a nitrogen content of 1.2%.

*Example 2*

316.8 parts of methanol at 5° C. were saturated with anhydrous ammonia and 100 parts of dry water solubles were added thereto with stirring. The resulting mixture was refluxed for 6 hours during which time anhydrous ammonia was continuously passed into the mixture. The residue after filtration was dried without further solvent treatment and a light brown powdery product was obtained. The yield of the methanol-ammonia treated material was 79.5% based on the weight of the dry starting material. The product contained 2.03% of nitrogen and was characterized by its excellent adhesive properties and lack of hygroscopicity.

In order to compare the properties of the above methanol-ammonia treated product with an adhesive prepared according to the process of application Serial No. 102,715, 50 parts of dry water solubles were added gradually to 118.8 parts of methanol with stirring. The resulting slurry was vacuum filtered, followed by three additional wash treatments with methanol, and thereafter the filter cake was slurried with 396 parts of anhydrous acetone. Vacuum was then reapplied until the cake was practically dry. The final residue was dried in a vacuum oven at 50° C.

The above described product was prepared as a 60% water solution. Drying tests were run on samples prepared by both methods by applying thin films of each to glass slides and noting the drying time at room temperature. The methanol extracted-acetone washed composition dried in 11 minutes, where the methanol-ammonia-treated material dried in only 4.5 minutes. Bonding tests were made by applying thin films of each adhesive solution to strips of cardboard and noting the time, at room conditions, required to obtain a bond stronger than the cardboard itself. With the methanol extracted-acetone washed material 15 minutes was required to form the bond, while the methanol-ammonia treated composition required only 5 minutes.

In another series of tests, 1 gram samples each of methanol extracted-acetone washed water soluble material and methanol-ammonia-treated water soluble material were further dried at 60° C. in vacuo for 2 hours. The dried samples were placed in desiccators maintained at 86.5% relative humidity and 90° F. The samples were examined after 16, 40, 64, 88, 160 and 592 hours and after 35 days for consistency and moisture change. All the samples of methanol-ammonia-treated water-soluble material maintained their powdery consistency throughout the entire test period of 35 days. The samples of methanol extracted-acetone washed water soluble material caked after 16 hours and became gummy after 40 hours.

Some of the more important comparative advantages of this invention are shown in the following table.

| Specimen | MeOH-Acetone Treated Masonoid | MeOH-NH Treated Masonoid |
| --- | --- | --- |
| Drying time on glass slide | 11 mins | 4½ mins. |
| Bonding Time on Cardboard | 15 mins | 5 mins. |
| Caking time @ 86.5% R. H. and 90° F. | 16 hrs | No caking throughout 35 days. |
| Percent Yield (Approximate) | 60–70% | 80%. |

In dealing with the determination of the hygroscopicity of the water soluble adhesives of the present invention, as well as with similar properties of other dry powders, it should be borne in mind that the absorption of moisture is dependent on many physical characteristics including surface area of the material, depth and weight of the sample, density, size and shape of the container employed, size and shape of the particular material being tested, and the temperature at which the tests are conducted. All these factors enter into the absorption of moisture by any dry powdery material and consequently it is difficult to compare the results of individual tests. In each instance it is only possible to make direct comparisons where the samples are tested at the same time and under exactly the same conditions.

The foregoing discussion of the present invention has presented a few of the variations which may be employed in my novel process. It will be apparent that any of the apparently widely different embodiments of the invention may be resorted to without departing from the spirit and scope thereof. The advantages to be derived from the invention consist primarily in the simplicity and economy of the process and in the greatly improved water absorption characteristics of the adhesive products.

I claim:

1. Process of preparing an improved non-caking water-soluble adhesive mixture comprising hydrolyzing lignocellulose materials under elevated temperature and pressure in the presence of moisture, recovering the water-soluble reaction product, concentrating said reaction product substantially to dryness by removing water therefrom, forming a slurry of said reaction product with methanol, refluxing the resulting mixture while passing ammonia into said mixture, filtering the mixture, and finally drying the residue.

2. Process of preparing an improved non-caking water-soluble adhesive mixture comprising hydrolyzing lignocellulose materials under elevated temperature and pressure in the presence of moisture, recovering the water-soluble reaction product, concentrating said reaction product substantially to dryness by removing water therefrom, forming a slurry of said reaction product with methanol in the ratio of about 3 parts methanol to 1 part of said reaction product by weight, refluxing the resulting mixture about 6 hours while passing ammonia into said mixture, filtering the mixture, and finally drying the residue.

3. Process of preparing an improved non-caking water-soluble adhesive mixture comprising hydrolyzing lignocellulose materials under elevated temperature and pressure in the presence of moisture, recovering the water-soluble reaction product, concentrating said reaction product substantially to dryness by removing water therefrom, saturating with ammonia-saturated methanol chilled to about 5° C., forming a slurry of said reaction product with the ammonia-saturated methanol in the weight ratio of about 3 parts methanol to 1 part of said reaction product, refluxing the resulting mixture about 6 hours while passing ammonia into said mixture, filtering the mixture, and finally drying the residue.

4. The process of preparing an improved non-caking water-soluble adhesive mixture which comprises forming a slurry of methanol and the water-soluble portion of the reaction product obtained by hydrolyzing lignocellulose materials under elevated temperature and pressure in the presence of moisture, refluxing the slurry while concurrently passing anhydrous ammonia thereinto, continuing the refluxing and passage of ammonia into the slurry for a period of time sufficient to impart to the adhesive mixture a fixed nitrogen content of from about 1% to about 2.5%, filtering the mixture, and drying the residue.

5. The process of preparing an improved non-caking water-soluble adhesive mixture which comprises forming a slurry of methanol and the water-soluble portion of the reaction product obtained by hydrolyzing lignocellulose materials under elevated temperature and pressure in the presence of moisture, passing anhydrous ammonia into said slurry at a temperature of about 0° C. to about 5° C. for a period of time sufficient to impart to the adhesive material a fixed nitrogen content of from about 1% to about 2.5%, filtering the mixture, and drying the residue.

6. A process as in claim 9 and wherein the methanol is saturated with ammonia prior to the formation of the methanol-water-soluble material slurry.

7. An improved dry water-soluble adhesive composition consisting essentially of ammoniated water-soluble material obtained from the reaction product of the hydrolysis of lignocellulose under elevated temperature and pressure in the presence of moisture, said composition having a fixed nitrogen content of from about 1% to about 2.5%.

References Cited in the file of this patent

UNITED STATES PATENTS

| | | |
|---|---|---|
| 2,549,822 | Koonce | Apr. 24, 1951 |

FOREIGN PATENTS

| | | |
|---|---|---|
| 449,474 | Great Britain | June 22, 1936 |
| 490,510 | Great Britain | Aug. 11, 1938 |
| 514,510 | Germany | Dec. 23, 1930 |